(12) United States Patent
Clark et al.

(10) Patent No.: US 6,426,837 B1
(45) Date of Patent: Jul. 30, 2002

(54) DIFFRACTIVE SELECTIVELY POLARIZING BEAM SPLITTER AND BEAM ROUTING PRISMS PRODUCED THEREBY

(75) Inventors: Rodney L. Clark, Gurley; Larry Pezzaniti, Harvest; Randy Crouse, Huntsville; David R. Brown, Harvest, all of AL (US)

(73) Assignee: Mems Optical, Inc., Huntsville, AL (US)

( * ) Notice: Subject to any disclaimer, the term of this patent is extended or adjusted under 35 U.S.C. 154(b) by 0 days.

(21) Appl. No.: 09/531,775

(22) Filed: Mar. 21, 2000

Related U.S. Application Data (60) Provisional application No. 60/125,550, filed on Mar. 22, 1999, and provisional application No. 60/142,979, filed on Jul. 12, 1999.

(51) Int. Cl.⁷ .................................................. G02B 5/30
(52) U.S. Cl. ....................... 359/485; 359/494; 359/495; 359/571; 356/71
(58) Field of Search ................................ 359/485, 494, 359/495, 571; 356/71

(56) References Cited

U.S. PATENT DOCUMENTS 4,330,175 A * 5/1982 Fujii et al. .................. 359/571
5,629,764 A * 5/1997 Bahuguna et al. ............ 356/71

FOREIGN PATENT DOCUMENTS

| EP | 0710856 | 5/1996 |
| GB | 0 710 856 A | * 8/1996 |
| WO | 92 21046 | 11/1992 |

OTHER PUBLICATIONS

Habraken, S. et al., "Polarizing holographic beam splitter on a photoresist," Nov. 15, 1995, Optics Letters, 22, pp. 2348–2350.*

Lopez A. G. et al., "Wave–Plate Polarizing Beam Splitter Based on a Form–Birefringement Multilayer Grating," Optics Letters, U.S., Optical Society of America, Washington, vol. 23 No. 20, Oct. 15, 1998, pp. 1627–1629, XP000786567.

Brundett D. L. et al., "Polarizing Mirror/Absorber for Visible Wavelengths Based on a Silicon Subwavelength Grating: Desing and Fabrication," Applied Optics, U.S., Optical Society of America, Washington, vol. 37, No. 13, f May 1, 1998, pp. 2534–2541, XP000754633.

* cited by examiner

*Primary Examiner*—Cassandra Spyrou
*Assistant Examiner*—Craig Curtis (57) ABSTRACT

A diffractive having a grating period that exhibits significant polarization selectivity is used as a polarizing beamsplitter for obliquely incident polarized light. The grating is preferably a subwavelength of the illuminating beam and is preferably designed to substantially transmit transverse magnetic mode (TM) polarized light and to substantially reflect transverse electric mode (TE) polarized light at certain wavelengths or angles of incidence. Due to ease of manufacture, the polarizing beamsplitter may be integrated along with other optical elements, such as a subwavelength retarder, to form a polarization beam router, a dichroic beam combiner, a beam splitter on a curved surface, or an optical pickup using an optical beam splitter and router.

8 Claims, 6 Drawing Sheets

DIFFRACTIVE SELECTIVELY POLARIZING BEAM SPLITTER AND BEAM ROUTING PRISMS PRODUCED THEREBY

This application claims priority on provisional Application Nos. 60/125,550 filed on Mar. 22, 1999 and 60/142,979 filed on Jul. 12, 1999, the entire contents of which are hereby incorporated by reference.

FIELD OF THE INVENTION

The present invention is directed to diffractive optical structures and, more particularly, to diffractive optical structures exhibiting significant polarizing selectivity, particularly those employing a subwavelength optical grating structure. Diffractive optical structures exhibiting significant polarizing selectivity according to the invention may be advantageously used for beam splitting.

DESCRIPTION OF THE RELATED ART

Polarizing beam splitters, such as those formed from a multi-layer dielectric stack, are known for selecting light of a particular polarization. However, such conventional beam splitters are relatively difficult to manufacture and design. Further, such stacked dielectric polarizing splitters are not particularly easy to integrate with other optical components.

Although diffractive polarization is a known problem in spectroscopy, the use of diffractives in beam separation, splitting or routing has not been previously recognized. Instead, the polarization selectivity exhibited by a diffractive was considered an undesired problem to be corrected.

The difference in the transmission of transverse electric mode (TE) and transverse magnetic mode (TM) polarized light in diffractive structures has also been documented in the antireflection context. However, the objective of the research on such diffractive subwavelength structures has been to minimize the difference in transmission in TE and TM light for near normal incident light. Such structures which equally transmit normally incident TE and TM polarized light are of little use when the selection of only one polarization is sought.

SUMMARY OF THE INVENTION

Applicants of the present application have discovered that diffractive optics may be used to separate a incident beam, acting as a polarizing beam splitter. Although these characteristics are most apparent in subwavelength structures, diffraction gratings having periods greater than the wavelength of the illuminating beam can also display significant polarization selectivity. Because the polarizing selectivity is best exhibited by subwavelength structures, the present application will discuss the inventive principles disclosed herein primarily in terms of such subwavelength structures. However, the principles disclosed herein also apply to diffractives employing grating periods greater than the wavelength of the illuminating beam so long as significant polarizing selectivity is exhibited.

Diffractive structures may have periodically repeating features, either over the entire structure or with different periods over different portions of the structure. Such structures also may have more than one period spatially superimposed. The period of a uniformly periodic diffraction grating may be defined as the smallest distance over which the grating structure repeats.

If the grating period of the subwavelength structure is less than half of the incident beam's wavelength, then only the zeroth diffraction order propagates, and all other diffraction orders are evanescent. Subwavelength structures show interesting properties such as antireflection, form birefringence, and emulation of distributed index materials.

An object of the invention is to provide a polarizing beam splitter which substantially obviates one or more problems or limitations of the conventional layered dielectric beam splitters.

Another object of the present invention is to use a diffractive beam splitter to separate beams.

Still another object of the present application is to develop a beam splitter or router that can be easily integrated in an assembly with other optical components.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, there is provided a polarizing beam splitter, including a diffraction grating provided on a surface and arranged at an oblique angle to an incident light beam, the diffraction grating including a plurality of repeating raised portions having a period selected to differentially transmit and reflect differently polarized components of the light beam. According to one preferred embodiment this selective transmission is accomplished with a subwavelength grating period.

Also in accordance with the present invention there is provided a beam router, including a prism having a beam of light incident thereon; and a diffraction grating integrated onto a surface of the prism and operating as a polarizing beam splitter.

Also in accordance with the present invention there is provided a method of splitting an incident light beam in dependence on the direction of polarization thereof including providing a diffraction grating on a substantially planar surface, the diffraction grating having a plurality of repeating raised portions having a period selected to differentially transmit and reflect differently polarized components of the light beam; and orienting the plane of diffraction grating at an angle a to the incident light beam, where a is less than 90% and greater than 0%, the incident light beam having a first polarized component parallel to the plane of the diffraction grating and a second polarized component perpendicular to the first polarized component, wherein the first polarized component is substantially reflected by the diffraction grating while the second polarized component is substantially transmitted.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and, together with the description, serve to explain the principles of the invention.

BRIEF DESCRIPTION OF THE DRAWINGS

Reference to the accompanying Figures provides further understanding by those skilled in the art of the numerous objects and advantages of the present invention, in which.

DESCRIPTION OF THE PREFERRED EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

The present invention, rather than minimizing the TE and TM transmittance difference for normally incident light as in the related art, exploits the difference in transmittance of TE and TM polarized light for oblique incidence on a diffractive structure. While these differences may be present in a diffractive having a grating period greater that the period of the illuminating beam as discussed below with reference to FIG. 10, the performance of a subwavelength diffractive is typically preferable.

Different embodiments of the present invention use this transmittance difference in different ways. In one embodiment of the invention, the transmittance is maximized for TM polarized light, and the reflectance is maximized for TE polarized light, thereby using the subwavelength structure as a polarizing beam splitter. Such a beam splitting device has wide applications, including beam combining, beam deflection, beam splitting, distributed feedback, optical signal processing, wavelength multiplexing and de-multiplexing, and beam routing.

Figure 1:
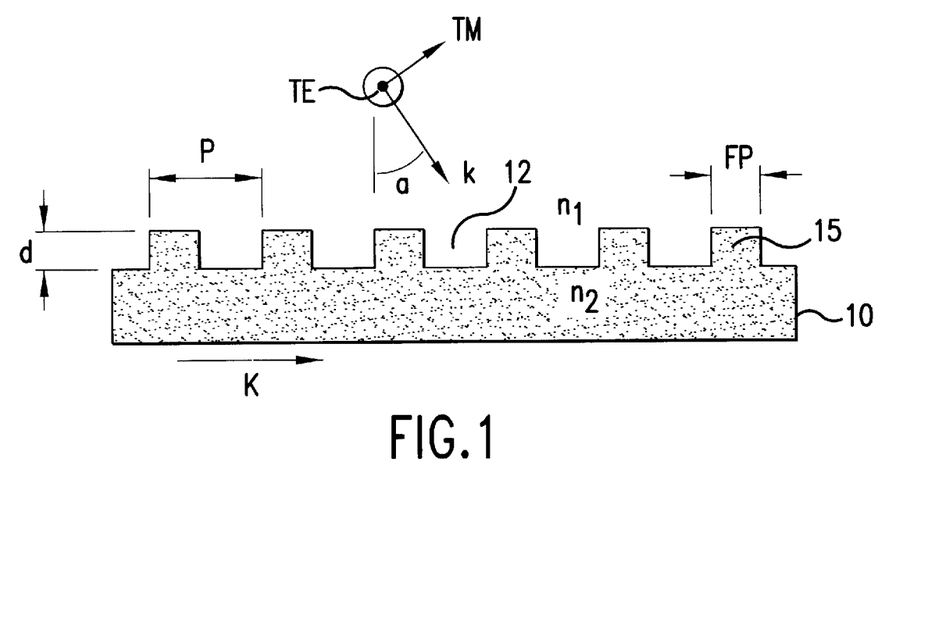
FIG. 1 is a schematic view of a diffractive grating according to the invention having rectangular profile.

FIG. 1 schematically illustrates a diffractive grating 10 used as a polarizing beam splitter. A light beam with direction k is incident on the grating 10 at an angle a with respect to a direction normal to the plane of the grating 10. The grating vector K has a direction perpendicular to the grooves 12 as shown and a magnitude equaling the grating period $2\pi/P$, where P is one period of the grating 10. The TE polarized component of an incident light beam is linearly polarized perpendicular to both the beam direction k and the grating vector K. That is, in FIG. 1, the TE vector extends, e.g., out of the page normal to the plane defined by the beam direction k and the grating vector K. The TM polarized component of the incident light beam is linearly polarized perpendicular to both the TE component and to the beam direction k. The refractive index of the incident medium is $n_1$ and the grating's refractive index is $n_2$. Both $n_1$ and $n_2$ can in general be chosen to be complex in order to optimize the performance of the polarizing beam splitter 10. The depth of the grating is d, and the grating fill factor is F. The fill factor F is defined as the width FP of a notch 15 divided by the grating's period P.

If the incident beam is incident on the grating at an oblique angle a, then the transmission of the TM polarized light beam can approach 1 (i.e., 100%) by choosing optimal grating depth d, fill factor F, and grating period P. The reason for high transmission of TM polarization is as follows. Suppose the grating is divided into a series of slices, each perpendicular to k. Considering several slices from medium $n_1$ to medium $n_2$, the average index of refraction of each slice will be higher than the slice above it. Thus as a light wave penetrates the grating it will gradually encounter material with larger and larger average indices of refraction. This effect is enhanced when the grating is tilted at a 45 degree angle. At this angle, the incident TM beam encounters an array of prisms, providing a slowly varying transition in the effective refractive index from $n_1$ to $n_2$. For TE polarized light, the reflection is strongly dependent on the etch depth d, the fill factor F and the grating profile geometry. Since the TM transmission is weakly dependent on grating structure, and the TE is strongly dependent, the grating structure 10 can be optimized to strongly reflect TE light while maintaining high transmission for TM polarized light.

Such a polarizing beam splitter is bidirectionally symmetric, in that it behaves the same for light entering the top of the splitter in one direction, as it does for light entering the bottom of the splitter in an opposite direction.

The polarizing beam splitter 10 described above has several advantages over other polarizing beam splitters such as those formed from a multi-layer dielectric stack. First, the cost of manufacturing the polarizing beam splitter according to the present invention can be much less than conventional polarizing beam splitters. For example, a master grating can be etched into a metal substrate such as nickel. The master grating then can be used to injection mold the grating structure into plastic in large volumes with a small per part cost. Alternatively, the grating may be etched directly onto an optical substrate.

Second, the design approach has several degrees of freedom such as the etch depth d, the fill factor F, and the grating period P. In addition, the grating profile need not have a rectangular pattern. Other patterns such as triangular patterns or two-dimensional diffraction grating patterns may be optimal for various applications and embodiments. The pattern could be two-level digital, as shown in FIG. 1, continuously varying, or any other type of pattern consistent with the teachings of the specification.

Third, the structures can be modeled and optimized with Rigorous Coupled Wave Analysis (RCWA) Code, mature analysis methods especially suited for subwavelength structures of arbitrary profiles. This RCWA code is described in, for example, E. N. Glytsis and T. K. Gaylord, "Rigorous 3-D coupled wave diffraction analysis of multiple superposed gratings in anisotropic media," Appl. Opt. 28, 2401–2421 (1989), which is incorporated herein by reference.

Fourth, the subwavelength structures can be fabricated directly on an particular optical substrate such as a mirror, lens or prism, thus integrating additional functionality onto a optical element. Such fabrication of subwavelength structures and diffractive beamsplitting structures directly onto different optical substrates allows for both space and cost savings, while retaining equivalent functionality. The following examples illustrate how diffractive structures in accordance with the invention can be applied to a wide variety of applications.

Figure 2:
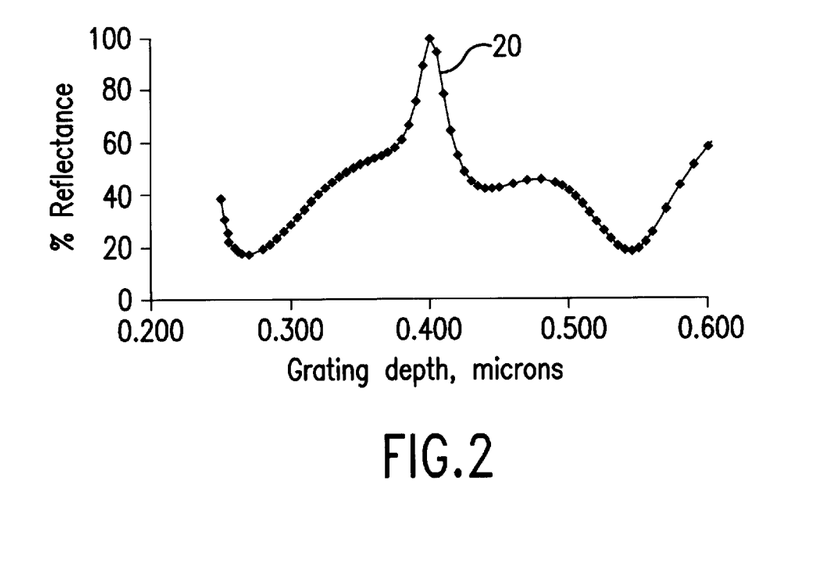
FIG. 2 is a graph of reflection of TE polarized light as a function of grating depth for the first exemplary polarizer design.

FIG. 2 shows the reflectance characteristic 20 of a rectangular profile subwavelength structure fabricated in plastic ($n_1=1$, $n_2=1.52$), oriented at a 45 degree angle with respect to the incident beam, a=45°. The wavelength of light is 650 nm. The grating period P=0.25 µm, and the fill factor F=0.5. The reflectance of TE light 20 is plotted against the grating depth d, to determine the grating depth at which the reflectance is a maximum. A local maximum of the reflectance is found for a grating depth of around 0.40 µm. The reflectance reaches 99.9% for TE polarized light.

Figure 3:
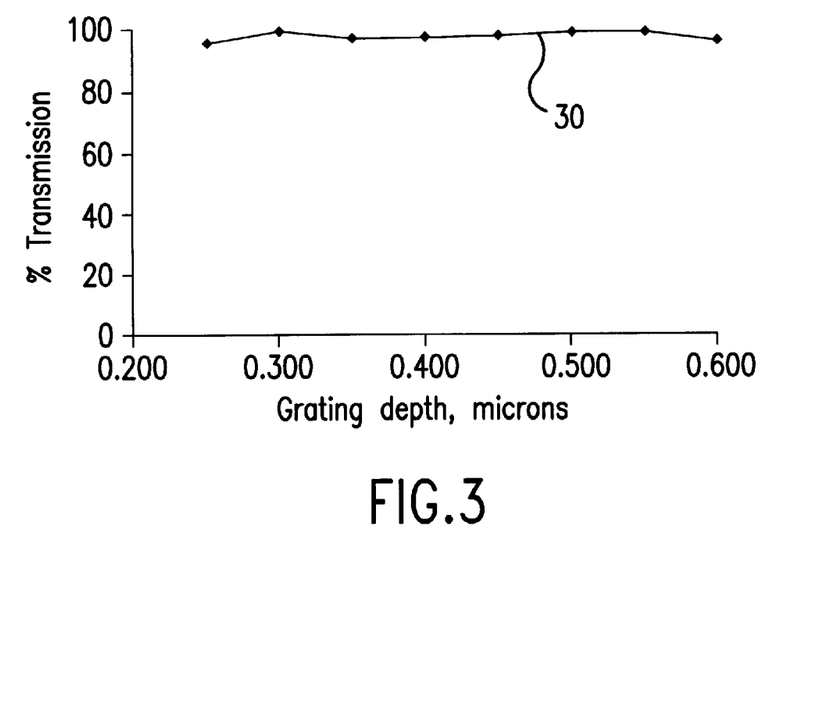
FIG. 3 is a graph of transmission of TM polarized light as a function of grating depth for the first exemplary polarizer design.

FIG. 3 shows the transmission characteristic 30 for TM polarized light of the same structure as above in FIG. 2. The transmission remains uniformly high, >98% for all etch depths. Thus, by maximizing the reflectance of the TE polarized light by adjusting the etch depth to 0.40 µm, the efficiency of the polarizing beam splitter is optimized.

Figure 4:
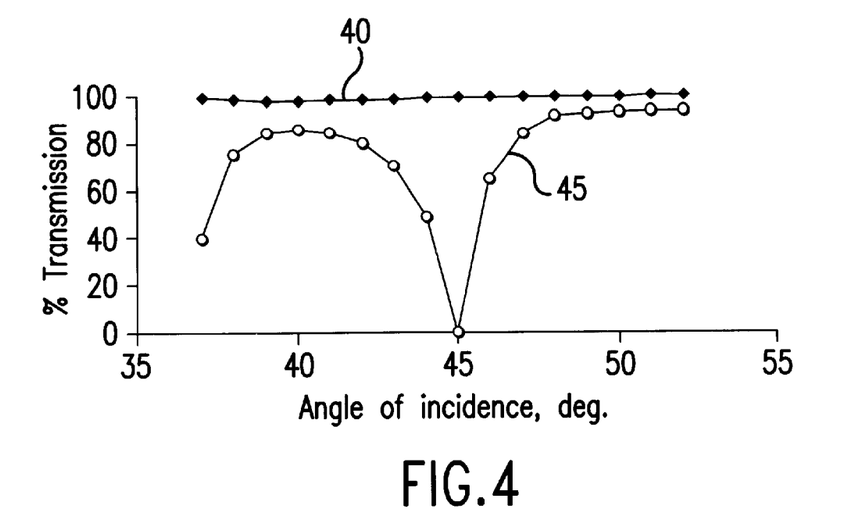
FIG. 4 is a graph of transmission of TE and TM polarized light over a range of angles of incidence for the first exemplary polarizer design.

Although the polarizing efficiency is high for the above design, the field of view and wavelength bandwidth are narrow. FIG. 4 gives the angular dependence of the grating, in which the TM transmission 40 remains high over the range of incidence angles, but the TE reflectance 45 falls off at angles of incidence away from 45 degrees.

Figure 5:
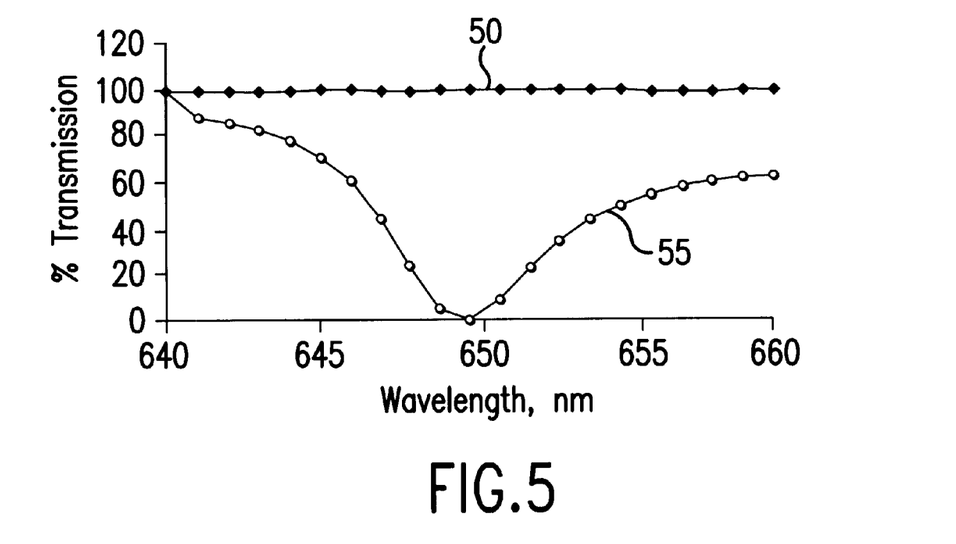
FIG. 5 is a graph of transmission of TE and TM polarized light incident at 45 degrees over a range of wavelengths for the first exemplary polarizer design.

FIG. 5 shows the wavelength dependence of the polarizing beam splitter according to the above design. This particular beam splitter design has a narrow bandwidth for TE reflectance 55. The TM transmission 50 remains high over the range of wavelengths shown. This design is suitable for an application that uses a laser beam which is collimated when it encounters the polarizing beam splitter. This collimated laser configuration is encountered in many optical systems.

Figure 6:
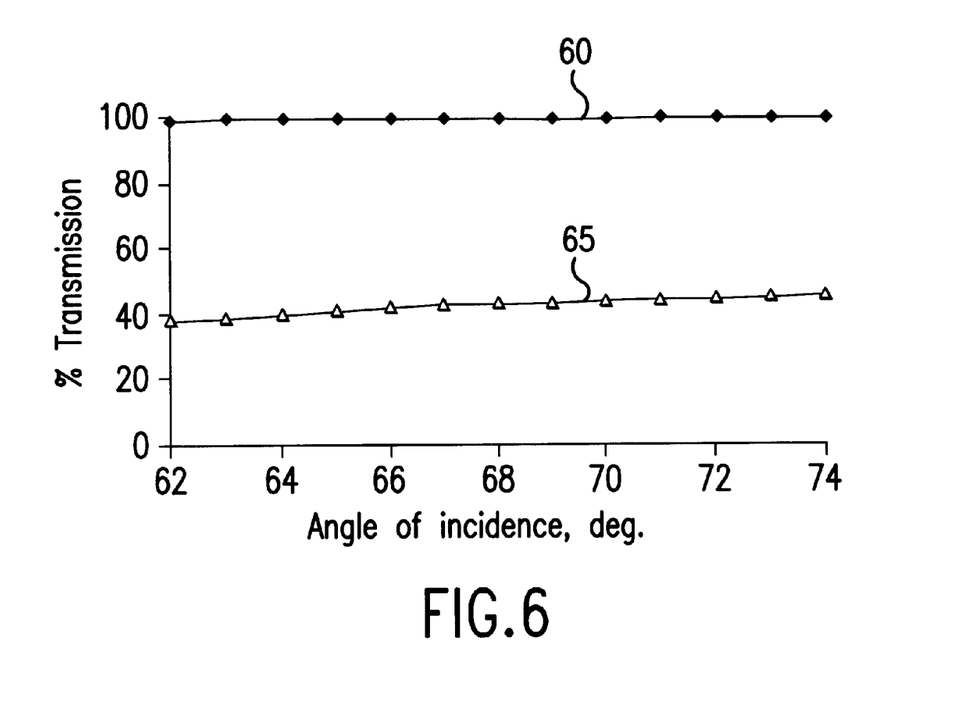
FIG. 6 is a graph of transmission of TE and TM polarized light over a range of angles of incidence for a second exemplary polarizer design.

Using the same rectangular-shaped grating, and choosing F=0.5, d=0.375 µm, and P=0.25 µm, the field of view of the grating can be extended. FIG. 6 shows the transmission characteristic 60 for TM and the transmission characteristic 65 for TE polarized light as a function of angle of incidence between 62 and 74 degrees. Again the transmittance 60 of the TM polarized beam is uniformly high, and the etch depth was chosen for a uniform reflection (i.e., 1 minus the transmittance 65) of approximately 55%. This second exemplary design is particularly useful for a system in which the laser beam is focused through the polarizing beam splitter, because the TE reflection does not vary over the relatively wide range of angles needed to focus a laser beam.

By modeling the subwavelength structure polarizing beam splitter using RCWA and varying the grating material, grating profile, grating period, grating depth and fill factor, the subwavelength structure polarizing beam splitter can be optimized for a given application.

There are other variables which can be used to optimize the grating for a particular application. In addition to the above described parameters, other grating parameters of the subwavelength structure polarizing beam splitter grating can be modified to optimize performance for a given application. For example, multiple periods superimposed on a single grating may be required to optimize performance for some applications. Multiple grating periods may also be modeled using RCWA. In addition, other shapes such as triangular or sinusoidal may be used instead of the rectangular profiles described here to increase performance.

A significant advantage of the subwavelength polarizing beam splitter according to the present invention is that it can be integrated onto a device that has other functionality. For example, the subwavelength polarizing beam splitter can be integrated with a subwavelength quarter wave retarder to form a polarization beam router. A subwavelength structure retarder, based on the difference in effective refractive index for TE and TM polarized light, has been described earlier, for example in I. Richter, Peng-Chen Sun, F. Xu, and T. Fainman, "Design considerations of form birefringent microstructures," Appl. Opt. 34, 2421–2429 (1995), which is incorporated herein by reference.

Figure 7A:
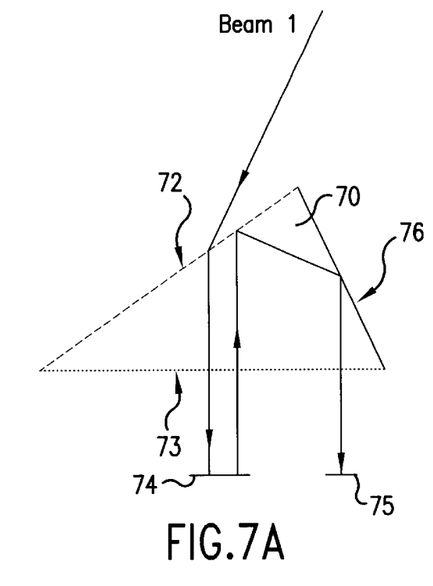
FIGS. 7A and 7B are side views of two beam routers, each including a subwave structure polarizer and a subwavelength structure retarder according to a third exemplary design.
Figure 7B:
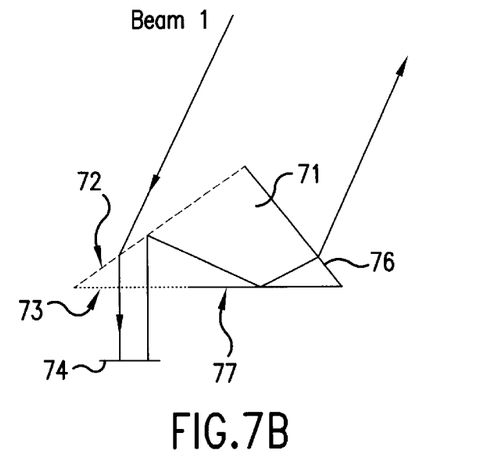

FIGS. 7A and 7B show two example geometries for routing beams using a polarizing beam splitter 72 integrated with a retarder 73. Both figures include a subwavelength structure polarizing beam splitter 72 and a subwavelength structure retarder 73 formed onto a single integrated prism (70 and 71, respectively). As used herein, a prism is understood to mean a transparent optical element having at least two faces inclined relative to each other, from which light is reflected or though which light is refracted.

In FIG. 7A, a TM polarized beam is transmitted through the subwavelength polarizer 72 formed on a top surface of the prism 70 with high efficiency. A quarter wave subwavelength structure retarder 73 is formed on the entire bottom surface of the prism 70. The orientation of the retarder grating vector K is nominally 45 degrees to TM polarized beam's electric field vector to convert the incident TM polarized beam to right circularly polarized beam. The right circularly polarized beam reflects from a reflecting surface 74. The reflecting surface 74 can be any type reflector, for example a specular reflector or partially diffuse reflector. The right circularly polarized beam changes handedness to left circularly polarized light upon reflection. The reflected left circularly polarized beam propagates back through the quarter wave retarder 73 and is converted to TE polarized light. This TE polarized light beam reflects off the subwavelength polarizing beam splitter surface 72, then reflects off a prism wall 76 due to total internal reflection as shown and exits the prism 70 through the bottom surface 73.

In FIG. 7B, a TM polarized beam is transmitted through the subwavelength polarizer 72 formed on a top surface of the prism 71 with high efficiency. A quarter wave subwavelength structure retarder 73 is formed on only a portion of the bottom surface of the prism 71. The orientation of the retarder grating vector K is nominally 45 degrees to TM polarized beam's electric field vector to convert the incident TM polarized beam to right circularly polarized beam. The right circularly polarized beam reflects from a reflecting surface 74. The right circularly polarized beam changes handedness to left circularly polarized light upon reflection. The reflected left circularly polarized beam propagates back through the quarter wave retarder 73 and is converted to TE polarized light. This TE polarized light beam reflects off the subwavelength polarizing beam splitter surface 72, then reflects the other portion 77 of the bottom surface of the prism 71 due to total internal reflection as shown. The light beam then exits the prism 71 through the right surface 76 back in the direction of the incident beam.

The functionality of the beam routers in FIGS. 7A and 7B may be used in a wide variety of applications, including optical read-out heads for Compact Disk players and DVD players. The beam router must be able to illuminate a surface in which information has been encoded, then route the retro-reflected beam to a detector. The advantage of the subwavelength structure prisms 70 and 71 introduced here is that the subwavelength structure polarizer 72 and subwavelength structure retarder 73 are fabricated onto one substrate. All the functionality that is often accomplished with two components, a polarizing beam splitter and a quarter wave retarder, is done with one integrated optic. Such a device is manufacturable using injection molding and other high volume low cost manufacturing techniques.

Figure 8:
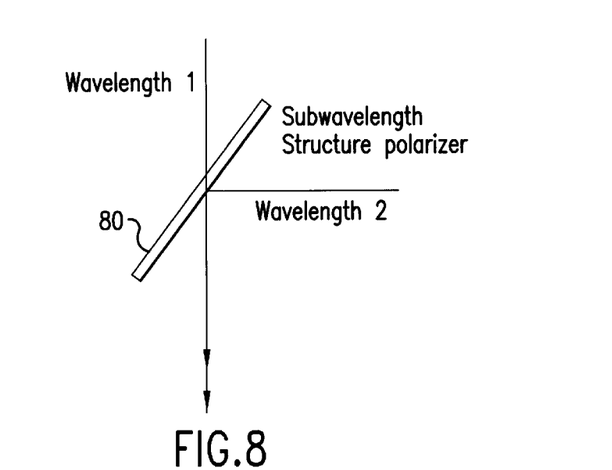
FIG. 8 is a side view of a subwavelength structure dichroic beam splitter according to a fourth exemplary design.

Subwavelength polarizing beam splitters can be designed to have a very narrow wavelength bandpass. For example, the polarizing beam splitter of Example 1 has a narrow wavelength bandwidth as my be seen in FIG. 5. This property of the subwavelength polarizing beam splitter can be used to form a Dichroic Beam Combiner. A Dichroic Beam Combiner 80 using a subwavelength structure is illustrated in FIG. 8. In this example, a beam of Wavelength 1 is polarized in the TM direction and transmitted through the polarizing beam splitter 80. A second beam at Wavelength 2 different than the first wavelength is polarized in the TE polarization state and reflected off of the polarizing beam splitter 80. In this FIG. 8, the two beams are combined to travel in the same direction, but are in orthogonal polarization states. Having the beams in orthogonal polarization states may be advantageous for separating the beams for routing purposes downstream of the combiner in the optical path.

In another embodiment of the exemplary design in FIG. 8, both the reflected and transmitted beams could be TE polarized. This is possible because as shown in Example 1 (FIG. 5), the subwavelength polarizing beam splitter is highly transmissive for TE polarized light for some wavelengths, even though for other wavelengths it is highly reflective. Turning to FIG. 8, the splitter would have to be transmissive for TE polarized light at Wavelength 1, but reflective for TE polarized light at Wavelength 2.

The subwavelength structure polarizing beam splitter according to the present invention can be fabricated on non-planar surfaces in addition to the above-described planar surfaces. Interferometric lithography techniques, for example, are well suited for making periodic structures on curved surfaces.

Figure 9:
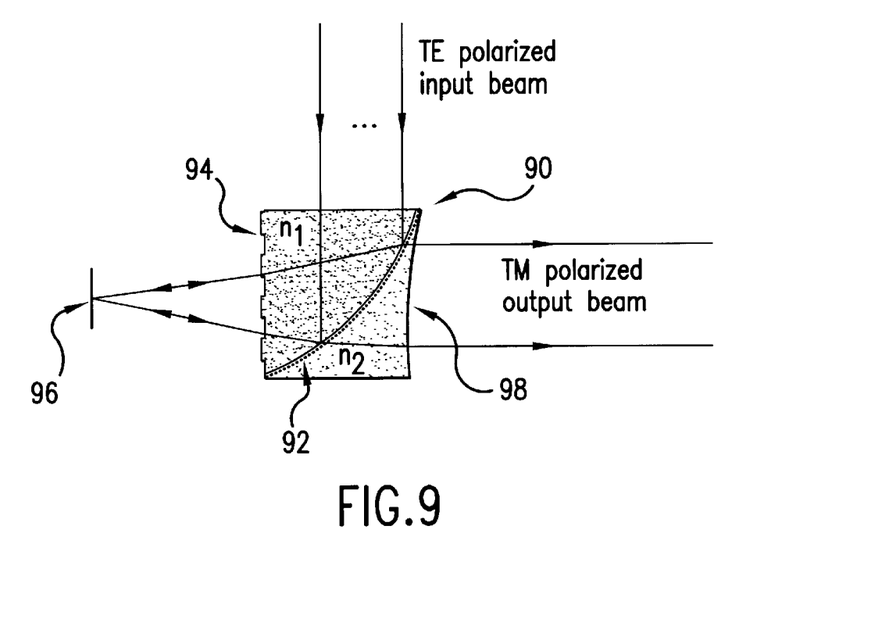
FIG. 9 is a side view of a subwavelength structure polarizing beam splitter form on a curved surface and integrated with a subwavelength structure retarder according to a fifth exemplary design.

The ability to put polarizing beam splitters on curved surfaces enables the polarizing beam splitting functionality of the subwavelength structure to be combined with the functionality of curved surfaces, lenses and mirrors for example. FIG. 9 shows an example of a subwavelength structure beam splitter 92 combined with a retarder 94 (as in Example 3), both combined with a curved surface 98 at the interface of a beam routing cube. The function of the beam routing cube is to accept a beam (shown here entering from the top) and focus the beam onto a reflector or partial reflector 96 such as a modulator or detector. A TE polarized beam (in this case collimated) enters the device from the top. It reflects off the curved beam splitting interface 92. The beam splitting interface 92 is shaped such that it causes the beam to come to focus outside the device as shown. The subwavelength structure 92 on the curved surface reflects TE polarized light with high efficiency, and transmits TM polarized light with high efficiency. A subwavelength retarder 94 is fabricated on the exit face of the device (left hand side) to convert the TE polarized light to right circularly polarized light. The right circular polarization state is changed to left circular polarized light upon reflection from reflector 96. The beam is converted to TM polarized light upon transmission back through the subwavelength structure retarder 94. The TM polarized beam is transmitted through the subwavelength structure polarizing beam splitter 92. The refractive index of the top half of the cube $n_1$ is different than the refractive index $n_2$ of the bottom half of the cube. This is done so that the curved interface 92 has focusing power. Finally, the right face of the cube 98 has a curvature to correct for wavefront aberrations associated with the propagation through the cube.

Diffraction gratings of spatial frequencies greater than the wavelength of the illuminating beam can also display significant polarization selectivity. In particular, a diffraction grating with a period chosen such that only the $1^{st}$ order beam propagates and all higher order diffracted beams are evanescent can be the foundation for an efficient beam routing polarizing beam splitter. Such nonsubwavelength gratings may be modeled and optimized with RCWA Code and analysis methods similar to those used to design the earlier-described subwavelength structures as would occur to one of ordinary skill in the art from the principals set forth in the present disclosure.

Figure 10:
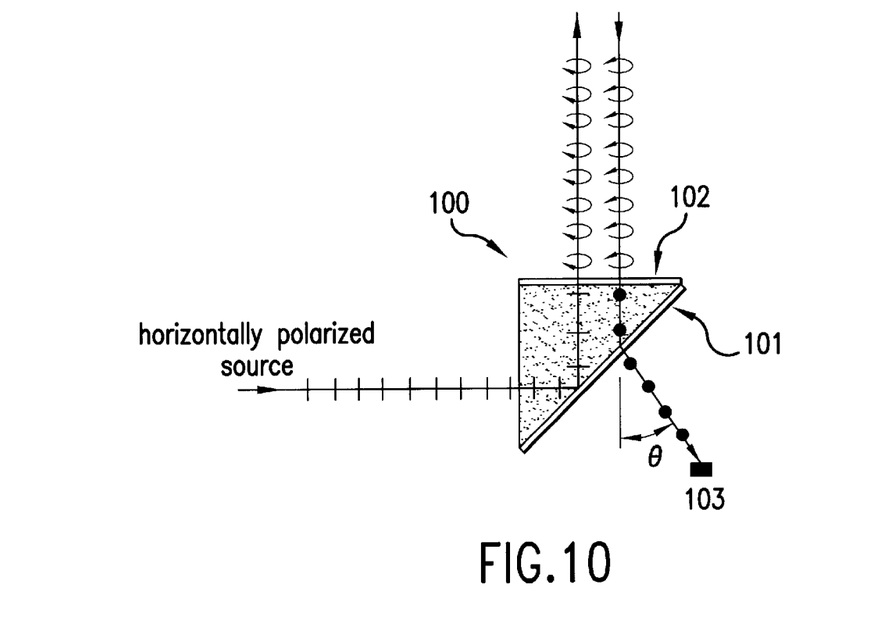
FIG. 10 is a side view of a prism beam splitter and router according to a sixth exemplary design.

FIG. 10 shows a beam router 100 including a grating 101 fabricated on the hypotenuse face of a right angle prism. This geometry has an advantage that all power in the $0^{th}$ diffracted order (both the $0^{th}$ component that would otherwise be transmitted and the $0^{th}$ reflected component) is reflected due to total internal reflection off the prism face. This can significantly increase the efficiency of the reflected path through the prism. If the grating is polarization selective, for example diffraction efficiency for TM polarized light is much greater than TE polarized light, then nearly all the TE polarized light is reflected off the hypotenuse face and a large amount of TM polarized light is diffracted on the return path.

To demonstrate the effect, a continuously sinusoidal grating 101 with period of 750 nm and grating depth of 120 nm was fabricated on the hypotenuse face of the prism 100 illustrated in FIG. 10. A subwavelength quarter wave retarder 102 was placed on the top exit face of the prism as shown. Laser light at 650 nm was introduced from the left-hand entrance face of the prism 100. The reflectance (total internal reflection) for horizontally polarized (TE) light was 73%, but for vertically polarized (TM) light the reflectance was 21%. The reflected beam transmitted through a quarter wave retarder 102 oriented at 45 degrees to convert the TE polarized light to right circularly polarized light as shown. The right circularly polarized beam was reflected off a mirror (not shown), converting it to left circularly polarized light and counter-propagated back to the exit face of the prism 100. The left circularly polarized light was converted to vertically polarized (TM) light upon transmission back through the quarter wave retarder 102. The TM polarized light was then passed through the polarizing grating 101 to the detector 103. The diffraction efficiency for the vertically polarized (TM) light was 39%, and the diffraction efficiency for TE polarized light was 6%. Thus the round trip efficiency of the prism from the entrance face of the prism to the detector is the efficiency of the reflected path 73% multiplied by the efficiency of the diffracted (return) path 39%, or 73%×39%=28%.

The router 100 can be optimized by selecting a grating profile that has maximum diffraction efficiency for TM polarized light and minimum diffraction efficiency for TE polarized light. The period for the grating is also an important consideration. The grating period may be chosen so that, at the angle of the prism interface (in this case 45 degrees), only the $0^{th}$ and +1 diffracted orders propagate for the wavelength of the laser beam. This is done so that the power in the laser beam is either diffracted or reflected and none of the power is wasted in higher orders, 2,3, . . . or negative orders −1, −2, . . . . However, grating periods that allow higher orders to propagate may be desired for other optical system considerations. For example, if it is desired that the return path diffracted beam propagate straight down (parallel to the returning beam), then a larger period is required that will allow $2^{nd}$, $3^{rd}$, or perhaps $4^{th}$ order beams to propagate as well. Grating parameters such as duty cycle, grating depth, grating profile (binary, sinusoidal, or other) may also be manipulated to optimize the round trip efficiency.

Use of the prism has other advantages in that different optical functions (e.g., in addition to beam splitting) may be applied to different surfaces of the prism. For example, a subwavelength structure retarder may be fabricated on the top surface of the prism (e.g., FIG. 10). A surface with focusing power may be fabricated on an entrance or exit face of the prism. The prism may be fabricated as a single part using for example injection molding techniques, thus integrating several optical functions into one compact, integrated part.

Figure 11:
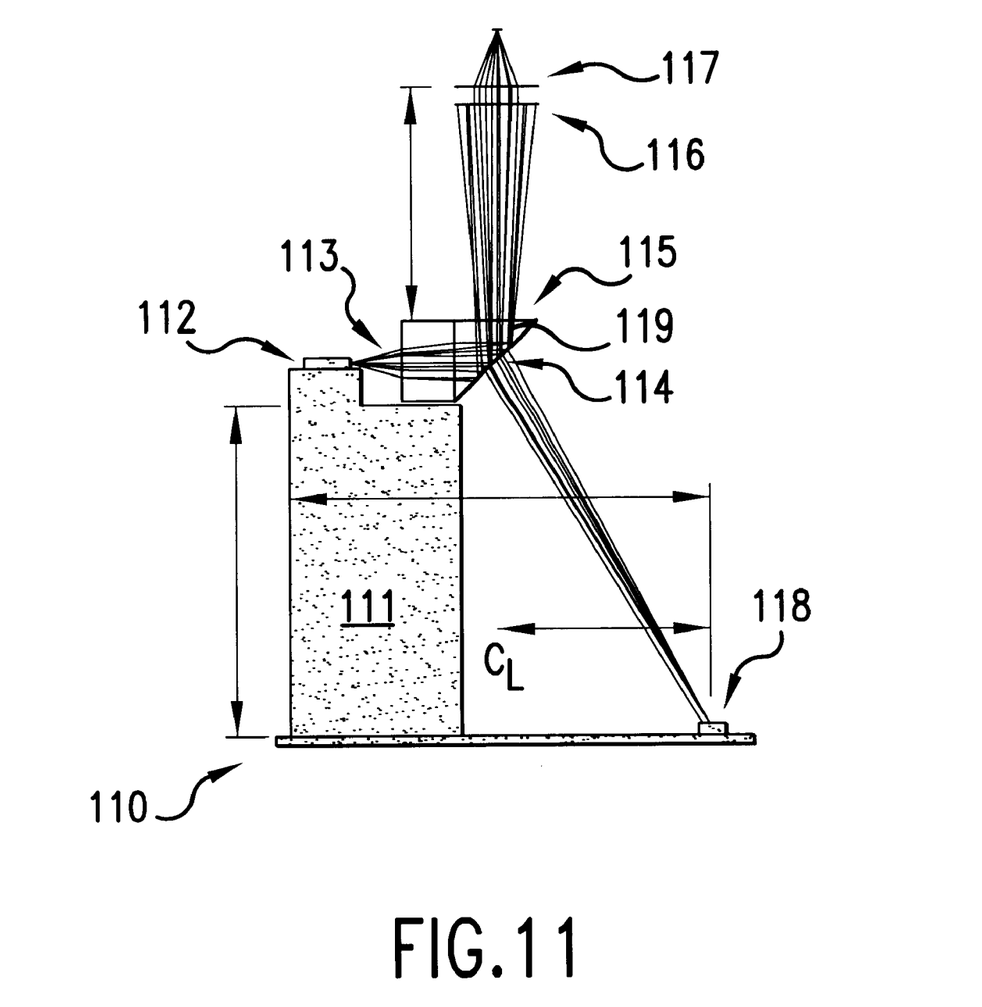
FIG. 11 is a side view of an optical device incorporating the prism beam splitter and router of FIG. 10.

FIG. 11 shows a preferred embodiment 110 for integrating the laser, optical beam routing beam splitter and the integrated detector shown schematically in FIG. 10. Light from a laser diode 112 diverges into a collimating lens 113 positioned on the left face of the prism 119. The laser diode 112, the collimating lens 113, and the prism 119 all sit atop a spacer 111. The rays from the laser 112 are nearly collimated so that the laser light does not overfill the objective lens 117 shown at the top of the figure. The aperture stop 116 also prevents such overfilling from occurring. A 3-beam generating grating is fabricated on top of the collimating lens 113 to generate three beams on the disk for tracking purposes. The polarizing grating 114 and the retarder grating 115 operate as described above. In the return path, the polarizing grating 114 diverts the image to the integrated detector 118.

Just as the beam routers in FIGS. 7A and 7B, the functionality of the beam routers in FIGS. 10 and 11 also may be used in a wide variety of applications, including optical read-out heads for Compact Disk players and DVD players.

It will be apparent to those skilled in the art that various modifications and variations can be made in the polarizing beam splitter and related optical elements of the present invention without departing from the scope or spirit of the invention. As an example, though subwavelength retarders were referenced throughout the specification, thin-film retarders as are conventionally used in liquid crystal displays (LCDs) may be substituted therefor, and are intended to be encompassed by the current invention. Further, other manufacturing techniques than those mentioned for integrating beam splitters directly onto optical elements may be used. The beam splitters and retarders mentioned may be integrated on other optical elements than those specifically mentioned.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A beam router, comprising:

a prism having a beam of light incident thereon;

a diffraction grating integrated onto a surface of the prism and operating as a polarizing beam splitter,
wherein a period of the diffraction grating is smaller than a wavelength of the light beam, and the grating selectively transmits and reflects differently polarized components of the light beam; and a retarder on another surface of the prism.

2. The beam router of claim 1 wherein the retarder is a subwavelength retarder.

3. The beam router of claim 1, wherein the light beam is reflected by the surface of the prism having the diffraction grating, is transmitted by the retarder, and strikes a reflecting surface.

4. The beam router of claim 2, wherein the light beam enters the prism through the surface of the prism with the diffraction grating, is transmitted by the retarder, and strikes a reflecting surface.

5. The beam router of claim 3, wherein all power in the zeroth diffracted order of the incident light beam is reflected from the hypotenuse face due to total internal reflection.

6. A beam router, comprising:

a prism having a beam of light incident thereon;

a diffraction grating integrated onto a surface of the prism and operating as a polarizing beam splitter,
wherein a period of the diffraction grating is smaller than a wavelength of the light beam, and the grating selectively transmits and reflects differently polarized components of the light beam; and another prism abutted to the surface with the diffraction grating to form a cube.

7. The beam router of claim 6, further comprising:

a retarder on another surface of the prism.

8. The beam router of claim 7, wherein the light beam is reflected by the surface of the prism having the diffraction grating, is transmitted by the retarder, and strikes a reflecting surface.

* * * * *